United States Patent
Rozner et al.

(10) Patent No.: US 10,168,976 B2
(45) Date of Patent: Jan. 1, 2019

(54) DYNAMIC DISPLAY ARRANGEMENT

(71) Applicant: International Business Machines Corporation, Armonk, NY (US)

(72) Inventors: Eric J. Rozner, Austin, TX (US); Inseok Hwang, Austin, TX (US); Su Liu, Austin, TX (US); Chin Ngai Sze, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/160,508

(22) Filed: May 20, 2016

(65) Prior Publication Data

US 2017/0337026 A1    Nov. 23, 2017

(51) Int. Cl.
*G06F 3/14* (2006.01)

(52) U.S. Cl.
CPC .......... *G06F 3/1423* (2013.01); *G06F 3/1454* (2013.01); *G09G 2356/00* (2013.01)

(58) Field of Classification Search
CPC ............ G06F 3/14; G06F 3/1415; G06F 3/1423–3/147; G06F 1/1647; G09G 5/12; G09G 2300/023; G09G 2300/026; G09G 2360/04; G09G 2360/06; G09G 2360/122; G02F 1/13336; H04M 2250/16
USPC ................................... 345/1.1–2.3
See application file for complete search history.

(56) References Cited

U.S. PATENT DOCUMENTS

| | | | |
|---|---|---|---|
| 5,923,307 A | 7/1999 | Hogle, IV | |
| 6,501,441 B1 * | 12/2002 | Ludtke | G06F 3/1446 |
| | | | 345/1.1 |
| 8,212,740 B1 | 7/2012 | Harris | |
| 8,368,616 B1 | 2/2013 | Harris | |
| 8,577,728 B2 | 11/2013 | Jones et al. | |
| 8,711,091 B2 | 4/2014 | Nomura et al. | |
| 8,963,801 B1 | 2/2015 | Harris | |
| 9,047,042 B2 * | 6/2015 | Sharma | G06F 3/1454 |
| 2005/0168399 A1 * | 8/2005 | Palmquist | G06F 1/1601 |
| | | | 345/1.1 |

(Continued)

FOREIGN PATENT DOCUMENTS

WO    2012025408 A1    3/2012

OTHER PUBLICATIONS

Anonymously, "Automatic Wireless Monitors Positioning", http://ip.com/IPCOM/000202287D, Dec. 13, 2010.

(Continued)

*Primary Examiner* — Roberto Flores
(74) *Attorney, Agent, or Firm* — Kunzler, PC (57) ABSTRACT

An apparatus, method, system, and program product are disclosed for dynamic display arrangement. One method includes receiving first information including one or more of location information corresponding to a first display of the multiple displays and information from an information handling device worn or held by a user. The method also includes receiving second information including one or more of location information corresponding to a second display of the multiple displays and context information corresponding to the first and second displays. The method includes determining an arrangement of the multiple displays based on the first and second information.

17 Claims, 9 Drawing Sheets

(56) References Cited

U.S. PATENT DOCUMENTS

| | | | |
|---|---|---|---|
| 2005/0237699 A1* | 10/2005 | Carroll | G06F 1/1616 361/600 |
| 2006/0001593 A1 | 1/2006 | Baudisch | |
| 2010/0007582 A1* | 1/2010 | Zalewski | A63F 13/00 345/8 |
| 2010/0053164 A1* | 3/2010 | Imai | G06F 3/011 345/427 |
| 2010/0106588 A1 | 4/2010 | Jones et al. | |
| 2011/0181565 A1 | 7/2011 | Asamura et al. | |
| 2012/0062475 A1* | 3/2012 | Locker | G06F 3/041 345/173 |
| 2012/0075166 A1* | 3/2012 | Marti | G06F 3/011 345/1.1 |
| 2012/0182210 A1 | 7/2012 | Chan et al. | |
| 2012/0242893 A1 | 9/2012 | Akitomo | |
| 2014/0002327 A1* | 1/2014 | Toren | G06F 3/1423 345/1.1 |
| 2014/0009395 A1 | 1/2014 | Ku et al. | |
| 2014/0093169 A1 | 4/2014 | Kim et al. | |
| 2014/0129938 A1 | 5/2014 | Tang | |
| 2014/0184470 A1 | 7/2014 | Anderson et al. | |
| 2014/0302773 A1* | 10/2014 | Jantunen | H04W 8/005 455/3.01 |
| 2015/0026357 A1* | 1/2015 | Kolekar | H04N 21/242 709/231 |
| 2015/0035998 A1 | 2/2015 | Mathew et al. | |
| 2015/0084837 A1* | 3/2015 | Mese | G06F 3/1446 345/1.3 |
| 2015/0085058 A1* | 3/2015 | Zhang | H04N 7/142 348/14.02 |
| 2015/0093990 A1* | 4/2015 | Lin | H04W 4/008 455/41.2 |
| 2015/0097757 A1* | 4/2015 | Bang | G06F 3/1454 345/2.2 |
| 2015/0128075 A1 | 5/2015 | Kempinski | |
| 2015/0199165 A1* | 7/2015 | Chopde | H04N 21/422 345/2.2 |
| 2016/0034050 A1* | 2/2016 | Ady | G06F 1/3231 345/619 |
| 2016/0034244 A1* | 2/2016 | Howard | G06F 3/1446 345/156 |
| 2016/0070523 A1* | 3/2016 | Kim | G06F 3/1454 345/2.3 |
| 2017/0316761 A1* | 11/2017 | Furukawa | G06F 3/0483 |

OTHER PUBLICATIONS

Anonymously, "Method to use a Mobile Device as a Virtual Selector in a Retail Store", http://ip.com/IPCOM/000212162D, Nov. 2, 2011.

Anonymously, "Zone-based User-Centric Service Provisioning Framework by Using Wireless Communication Technology", http://ip.com/IPCOM/000209546D, Aug. 9, 2011.

Richtel, In Data Deluge, Multitaskers Got to Multiscreens, The New York Times, http://www.nytimes.com/2012/02/08/technology/for-multitaskers-multiple-monitors-improve-office-efficiency.html, Feb. 7, 2012.

Roman, Increasing Productivity: How Dual Monitors Can Save You Time and Money, Business.com, http://www.business.com/computers/increasing-productivity-how-dual-monitors-can-save-you-time-and-money/, Jul. 30, 2015.

Ross, "Two Screens Are Better Than One", Microsoft Research, http://research.microsoft.com/en-us/news/features/vibe.aspx, Sep. 22, 2003.

Anderson et al, "Productivity and Multi-Screen Displays", sponsored by ATI Technologies Inc. and NEC/Mitsubishi, https://www.ergotron.com/Portals/0/literature/whitePapers/english/Multi-Mon-Report.pdf, Jul. 18, 2003.

Hekimian-Williams et al., "Accurate Localization of RFID Tags Using Phase Difference", http://compgeom.com/~piyush/papers/rfid2010.pdf, 2010 IEEE International Conference on RFID (IEEE RFID 2010), Apr. 2010.

Peng et al., BeepBeep: A High-Accuracy Acoustic-Based System for Ranging and Localization Using COTS Devices, ACM Transactions on Embedded Computing Systems, vol. 11, No. 1, Article 4, Publication date: Mar. 2012.

Xiong et al., "Array Track: A Find-Grained Indoor Location System", http://www.cs.princeton.edu/~kylej//papers/arraytrack-nsdi13.pdf, Presented as part of the 10th USENIX Symposium on Networked Systems Design and Implementation (NSDI 13), 2013.

* cited by examiner

DYNAMIC DISPLAY ARRANGEMENT

FIELD

The subject matter disclosed herein relates to displays and more particularly relates to dynamic display arrangement.

BACKGROUND

Multiple displays may be used for computer related operations. The displays may be arranged in any useful arrangement, such as horizontally, vertically, and/or in a grid. In some configurations, displays are arranged by a user selecting the display arrangement manually each time that a different display arrangement is used.

BRIEF SUMMARY

A method for dynamic display arrangement is disclosed. An apparatus and computer program product may also perform the functions of the method. In one embodiment, an apparatus includes an interface module that receives first information including one or more of location information corresponding to a first display of multiple displays and information from an information handling device worn or held by a user. In some embodiments, the interface module receives second information including one or more of location information corresponding to a second display of the multiple displays and context information corresponding to the first and second displays. The apparatus, in a further embodiment, includes an arrangement determination module that determines an arrangement of the multiple displays based on the first and second information. In various embodiments, at least a portion of the interface module and the arrangement module includes one or more of hardware and executable code with the executable code being stored on one or more computer readable storage media.

A method for arranging multiple displays is disclosed. In one embodiment, the method includes receiving first information including one or more of location information corresponding to a first display of the multiple displays and information from an information handling device worn or held by a user. In various embodiments, the method includes receiving second information including one or more of location information corresponding to a second display of the multiple displays and context information corresponding to the first and second displays. In some embodiments, the method includes determining an arrangement of the multiple displays based on the first and second information.

A computer program product for arranging a multiple displays is disclosed. In some embodiments, the computer program product includes a computer readable storage medium having program instructions embodied therewith. In certain embodiments, the program instructions are executable by a processor to cause the processor to receive first information including one or more of location information corresponding to a first display of the multiple displays and information from an information handling device worn or held by a user. In various embodiments, the program instructions are executable by a processor to cause the processor to receive second information including one or more of location information corresponding to a second display of the multiple displays and context information corresponding to the first and second displays. In certain embodiments, the program instructions are executable by a processor to cause the processor to determine an arrangement of the multiple displays based on the first and second information.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture ("ISA") instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). In some embodiments, electronic circuitry including, for example, programmable logic circuitry, field-programmable gate arrays ("FPGA"), or programmable logic arrays ("PLA") may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure may refer to elements of proceeding figures. Like numbers refer to like elements in all figures, including alternate embodiments of like elements.

Figure 1A:
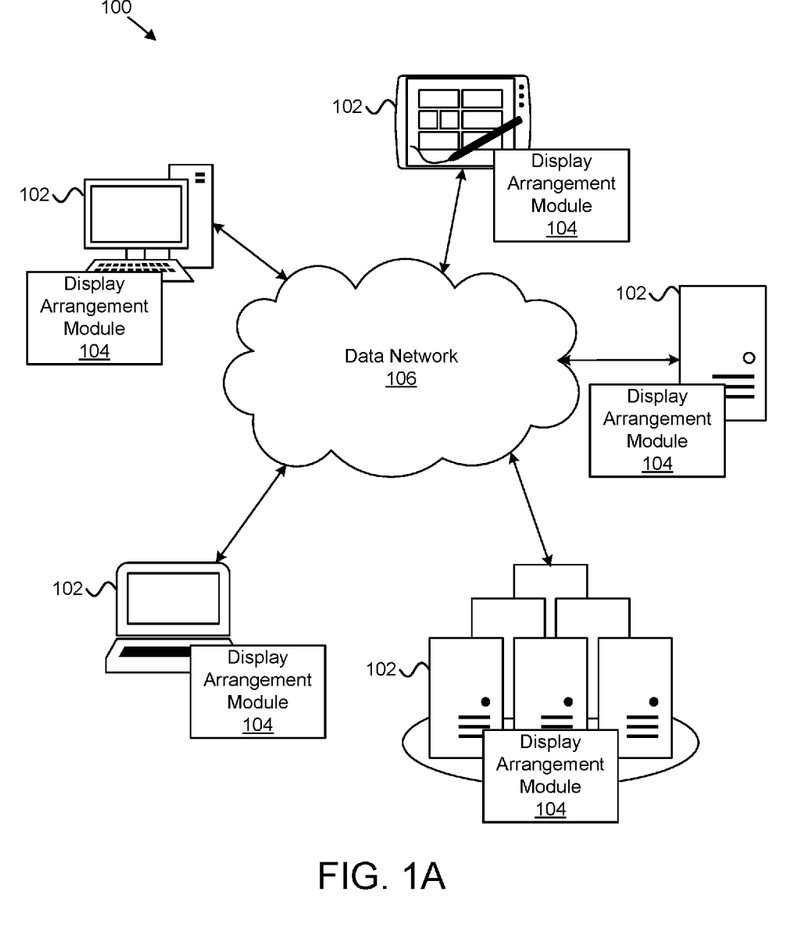
FIG. 1A is a schematic block diagram illustrating one embodiment of a system for dynamic display arrangement in accordance with one embodiment of the present invention.

FIG. 1A depicts one embodiment of a system 100 for dynamic display arrangement. In one embodiment, the system 100 includes information handling devices 102, display arrangement modules 104, and data networks 106. Even though a particular number of information handling devices 102, display arrangement modules 104, and data networks 106 are depicted in the system 100 of FIG. 1A, one of skill in the art will recognize that any number or configuration of information handling devices 102, display arrangement modules 104, and data networks 106 may be present in the system 100.

The information handling devices 102, in certain embodiments, include computing devices, such as desktop computers, laptop computers, tablet computers, smart phones, smart televisions, fitness trackers, activity trackers, personal electronic devices, smart watches, or the like. The information handling devices 102 may also include servers, such as web servers, application servers, file servers, media servers, email servers, cloud servers, backup servers, virtual servers, or the like. In some embodiments, the information handling devices 102 may be part of a data center used for data storage, data backup, data replication, disaster recovery, mirroring, and/or the like. The information handling devices 102 may be located in geographically remote locations, in the same geographic location (e.g., the same data center), or some combination of both.

The information handling devices 102 may be configured to store data, backup data, replicate data, or the like. For example, the information handling devices 102 may be configured to perform synchronous or asynchronous data replication. In another example, information handling devices 102 may be configured as failover devices for one or more associated information handling devices 102. Moreover, the information handling devices 102 may include one or more storage volumes, storage devices, redundant array of independent disks ("RAID") devices or configurations, or the like, such as hard-disk drives, solid-state drives, flash memory devices, random-access memory ("RAM"), serial advanced technology attachment ("SATA") devices, tape devices, or the like. In some embodiments, the information handling devices 102 are in communication via one or more data networks 106, described below.

In one embodiment, the display arrangement module 104 receives first information including one or more of location information corresponding to a first display of multiple displays and information from an information handling device worn or held by a user. The display arrangement module 104 receives second information including one or more of location information corresponding to a second display of the multiple displays and context information corresponding to the first and second displays. The display arrangement module 104 determines an arrangement of the multiple displays based on the first and second information. In this manner, the display arrangement module 104 may facilitate dynamically arranging multiple displays (e.g., automatically arranging multiple displays without a user configuring the arrangement of the multiple displays each time the arrangement of the multiple displays changes). As may be appreciated, dynamically arranging displays may enable a user to physically move displays into a different physical arrangement and not manually change settings to setup the different physical arrangement in software. Further, dynamically arranging displays may enable a user to change from using one physical arrangement in one geographic location to using another physical arrangement in another geographic location without manually changing software settings to adjust between the different physical arrangements.

As may be appreciated, the display arrangement module 104 may be used in any suitable system 100. In certain embodiments, as described below with reference to FIGS. 2 and 3, the display arrangement module 104 includes multiple modules that perform the operations of the display arrangement module 104.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN"), an optical fiber network, the internet, or other digital communication network. The data network 106 may include two or more networks. The data network 106 may include one or more servers, routers, switches, and/or other networking equipment. The data network 106 may also include computer readable storage media, such as a hard disk drive, an optical drive, non-volatile memory, RAM, or the like.

Figure 1B:
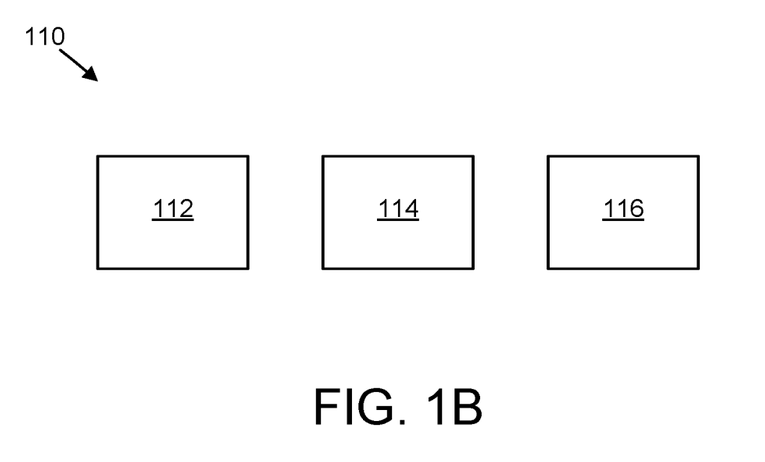
FIG. 1B is a schematic block diagram illustrating one embodiment of a horizontal arrangement of displays.
Figure 1C:
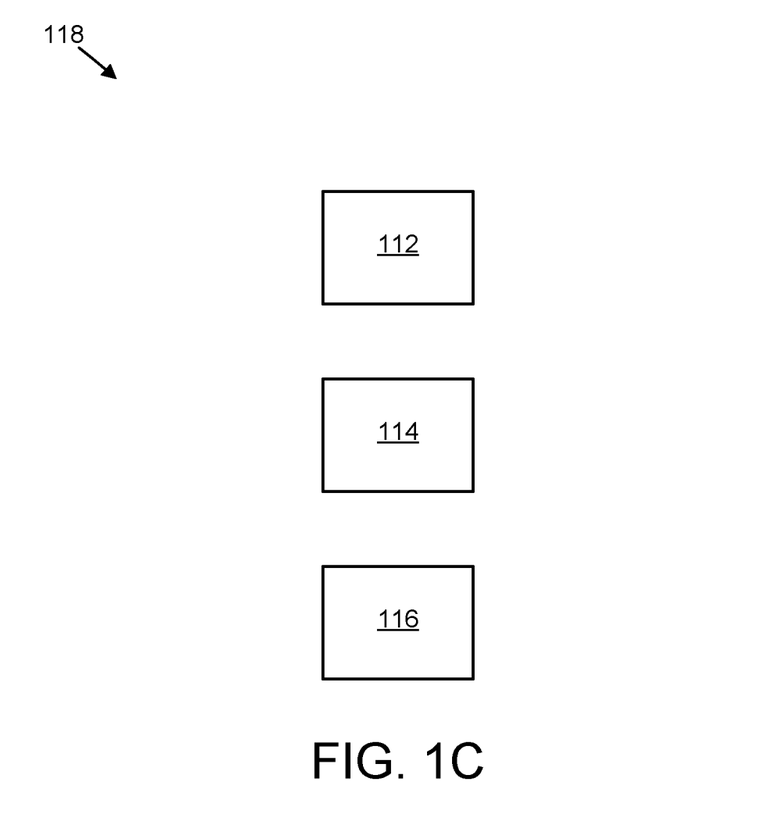
FIG. 1C is a schematic block diagram illustrating one embodiment of a vertical arrangement of displays.
Figure 1D:
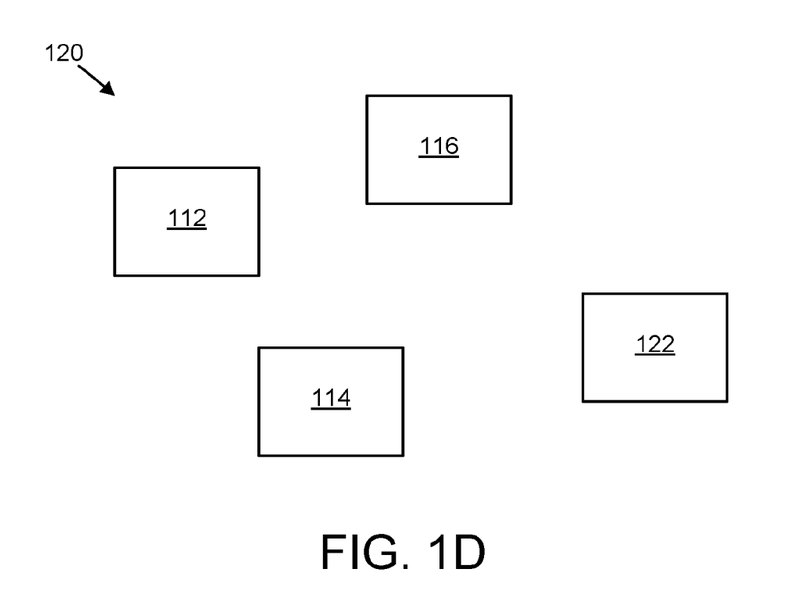
FIG. 1D is a schematic block diagram illustrating one embodiment of a scattered arrangement of displays.
Figure 1E:
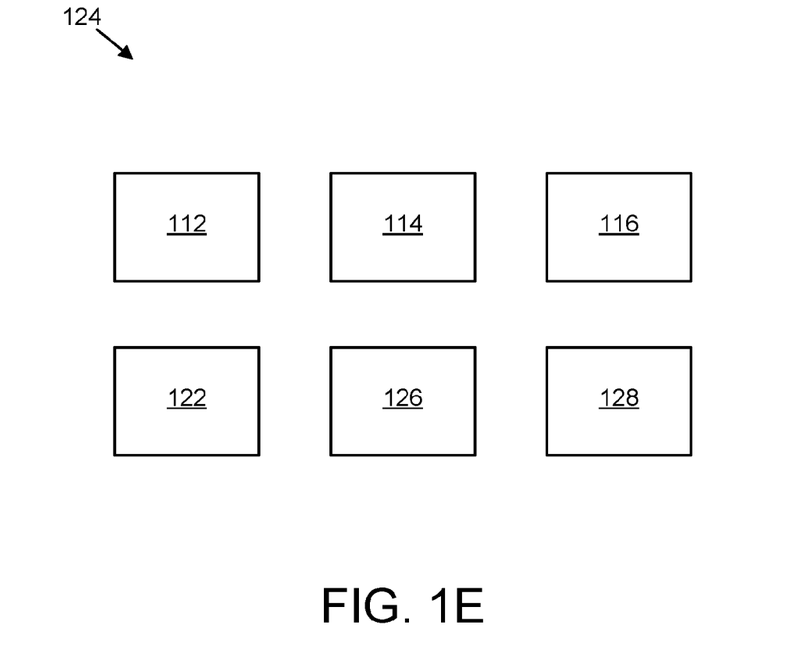
FIG. 1E is a schematic block diagram illustrating one embodiment of a grid arrangement of displays.

FIG. 1B is a schematic block diagram illustrating one embodiment of a horizontal arrangement 110 of displays. Specifically, as illustrated, displays 112, 114, 116 are arranged horizontally (e.g., in a row). FIG. 1C is a schematic block diagram illustrating one embodiment of a vertical arrangement 118 of displays. As illustrated, the displays 112, 114, 116 are arranged vertically (e.g., in a column). FIG. 1D is a schematic block diagram illustrating one embodiment of a scattered arrangement 120 of displays. As illustrated, the displays 112, 114, 116, 122 are arranged in a scattered arrangement without rows and/or columns. FIG. 1E is a schematic block diagram illustrating one embodiment of a grid arrangement 124 of displays. As illustrated, the displays 112, 114, 116, 122, 126, 128 are arranged in rows and columns. Specifically, the displays 112, 114, 116 are arranged in a first row, and the displays 122, 126, 128 are arranged in a second row. Further, the displays 112, 122 are arranged in a first column, the displays 114, 126 are arranged in a second column, and the displays 116, 128 are arranged in a third column. As may be appreciated, the arrangements described in FIGS. 1B through 1E may be physical arrangements and/or software arrangements of displays. In certain embodiments, the physical arrangement of displays may be different from the software arrangement of displays, while, in some embodiments, the physical arrangement of displays may match the software arrangement of displays. In various embodiments, when the software arrangement of displays does not match the physical arrangement of displays, the display arrangement module 104 may be used to change the software arrangement of the displays.

Figure 2:
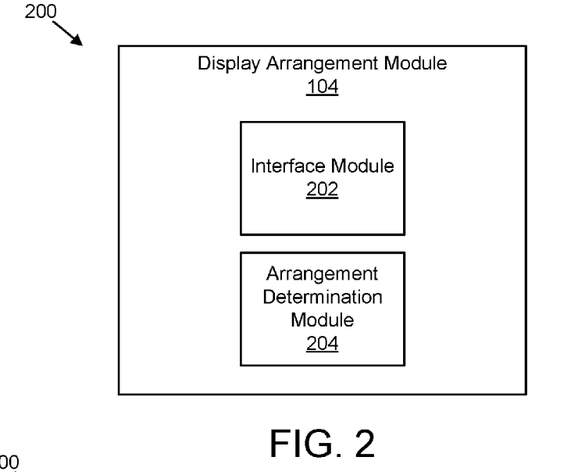
FIG. 2 is a schematic block diagram illustrating one embodiment of a module for dynamic display arrangement in accordance with one embodiment of the present invention.

FIG. 2 is a schematic block diagram illustrating one embodiment of a module 200 for dynamic display arrangement. As used herein, display may refer to a monitor, a screen, or the like, that may be used to show information (e.g., computer monitor, laptop screen, smart phone screen, television screen, and so forth). In one embodiment, the module 200 includes an embodiment of a display arrangement module 104. The display arrangement module 104, in various embodiments, includes one or more of an interface module 202 and an arrangement determination module 204, which are described in more detail below.

In one embodiment, the interface module 202 receives first information including one or more of location information corresponding to a first display of multiple displays and information from an information handling device worn or held by a user. In some embodiments, the interface module 202 receives second information including one or more of location information corresponding to a second display of the multiple displays and context information corresponding to the first and second displays.

For example, in certain embodiments, the interface module 202 receives location information corresponding to the first display and location information corresponding to the second display. In such embodiments, the first and second displays may wirelessly transmit location information to a device including the display arrangement module 104. Although a first and second display are described, the interface module 202 may receive location information from any suitable number of displays. For example, the interface module 202 may receive location information from 2, 3, 4, 5, 6, 7, 8, 9, 10, or more displays.

The location information may be any suitable location information. For example, the location information may be any suitable information from which location information regarding the displays may be determined. In one embodiment, the location information may include wireless information from which localization may be performed. It should be noted that the location information may not indicate an exact location, but may indicate a relative position of the displays to one another. In certain embodiments, the location information may be determined from signal characteristics found in a wireless transmission, such as signal information found in a Wi-Fi transmission, a Bluetooth™ transmission, a radio-frequency identification ("RFID") transmission, a Zigbee® transmission, a multiple-input and multiple-output ("MIMO") transmission, an audio transmission, a wireless display ("WiDi") transmission, a sensory transmission, and so forth. In some embodiments, the location information may include geospatial location information of the displays.

In some embodiments, the interface module 202 may receive location information from displays at predetermined intervals. For example, the displays may transmit location information at predetermined intervals, such as every second, every few seconds, every minute, and so forth, so that the interface module 202 receives the location information from the displays at predetermined intervals. In various embodiments, the interface module 202 may request that the displays provide location information at predetermined intervals selected by the interface module 202.

In certain embodiments, the interface module 202 may receive information from displays in response to a detected motion. For example, a sensor on the displays may detect motion and may transmit location information to the interface module 202 in response to detecting the motion. As another example, an information handling device 102 held by, attached to, and/or used by a user may detect a motion using a sensor and request location information from the displays in response to detecting the motion. The sensor used to detect motion may be any suitable sensor, such as a motion sensor, a gyroscope, an accelerometer, a camera, and so forth. The information handling device 102 may include one or more of a watch, an activity tracker, a smart phone, or the like.

In some embodiments, the interface module 202 may receive information from displays in response to a software application change. For example, in one embodiment, if a presentation software is switched to presentation mode, the interface module 202 may request that the displays transmit location information to the interface module 202. As another example, in certain embodiments, if a display detects a change to a full screen display mode, the display may transmit location information to the interface module 202.

In certain embodiments, the first information includes information from the information handling device (e.g., information handling device 102) worn by, used by, and/or held by the user and the second information includes context information corresponding to the first and second displays.

The first information may indicate a movement of the user, a location of the user, and so forth. Moreover, while first and second displays are described herein, any number of displays may be used in addition to the first and second displays.

In various embodiments, the context information includes a rule for the arrangement of displays based on the information received from the information handling device. For example, the rule may include an indication to arrange displays in response to one or more of a user sitting and a user standing, as detected by the information handling device 102. This rule may be used when a user has a set of displays having a first arrangement (e.g., horizontal) used while working in a standing position, and a set of displays having a second arrangement (e.g., vertical) used while working in a sitting position. In some embodiments, the set of displays for the first and second arrangement may be the same, but the user may physically change the location of one or more of the displays based on whether the user is sitting or standing.

As another example, the rule may include an indication to arrange the multiple displays based on a physical location of the user, as determined by the information handling device 102. For instance, the user may have one set of monitors used at work having one arrangement, and the user may have another set of monitors used at home having another arrangement. As a further example, the rule may include an indication to arrange the multiple displays based on an application being used on one or more of the displays. For instance, a display showing a selected application (e.g., presentation software) may always be positioned at a certain place in an arrangement (e.g., on top of a vertical arrangement, on bottom of a vertical arrangement, on the left of a horizontal arrangement, on the right of a horizontal arrangement, in the center of a grid arrangement, and so forth). As used herein, a horizontal arrangement may be used to describe displays arranged in a substantially horizontal row, a vertical arrangement may be used to describe displays arranged in a substantially vertical column, and a grid arrangement may be used to describe displays arranged in multiple vertical columns and horizontal rows.

The arrangement determination module 204, in one embodiment, determines an arrangement of the multiple displays based on the first and second information received. For example, in embodiments in which the displays transmit location information, the arrangement determination module 204 may process the location information to determine a horizontal and/or vertical arrangement of the displays and/or the order of the displays in the arrangement. As another example, the arrangement determination module 204 may compare information received from an information handling device 102 to context rules to determine the arrangement of the displays. In certain embodiments, the arrangement for the multiple displays may be set (e.g., configured, implemented) based on the determined arrangement.

In various embodiments, the arrangement determination module 204 may determine the arrangement of the multiple displays based on device characteristics, such as an application state running on a device, programmable settings for physical output (e.g., brightness or contrast), and/or static, physical device attributes (e.g., screen size).

In certain embodiments, at least a portion of the interface module 202 and the arrangement determination module 204 include one or more of hardware and executable code. In such embodiments, the executable code may be stored on one or more computer readable storage media.

Figure 3:
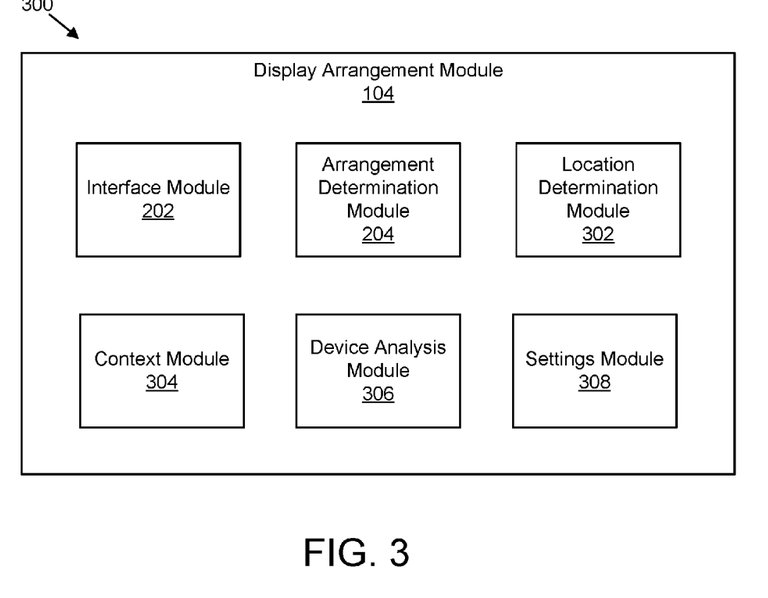
FIG. 3 is a schematic block diagram illustrating one embodiment of another module for dynamic display arrangement in accordance with one embodiment of the present invention.

FIG. 3 is a schematic block diagram illustrating one embodiment of another module 300 for dynamic display arrangement. In one embodiment, the module 300 includes an embodiment of a display arrangement module 104. The display arrangement module 104, in various embodiments, includes one or more of an interface module 202 and an arrangement determination module 204, which may be substantially similar to the interface module 202 and the arrangement determination module 204 described above. The display arrangement module 104 may also include one or more of a location determination module 302, a context module 304, a device analysis module 306, and a settings module 308, which are described in more detail below.

In one embodiment, the location determination module 302 determines a location of the first display using the first information and determines a location of the second display using the second information. It should be noted that the location determination module 302 may determine the location of any number of displays used. The location determination module 302 may determine the location of the displays using location information received from the displays. Moreover, in some embodiments, the location determination module 302 may determine the location of the displays using any suitable algorithm for determining a location of a display based on signals received from the display. Such locations of the displays may not indicate an exact geospatial position, but may indicate a location of the displays relative to one another. In various embodiments, the location determination module 302 may determine a location of the displays based on an information handling device 102 held by, used by, and/or worn by a user.

The context module 304, in certain embodiments, determines context information corresponding to the displays. In some embodiments, a user may define rules for the context module 304 to use to determine an arrangement of the displays. For example, in one embodiment, the context information includes a rule for the arrangement of the multiple displays based on information from an information handling device 102 held by, used by, and/or worn by a user. In various embodiments, the information handling device 102 may include a camera used to detect whether a user is sitting or standing and/or to detect an arrangement of displays used by the user. In such embodiments, the displays used by the user may be automatically arranged based on the detected arrangement. In certain embodiments, the rule includes an indication to arrange the displays in response to one or more of a user sitting and a user standing. In some embodiments, the rule includes an indication to arrange the displays based on a physical location (e.g., geospatial location, work, home, etc.) of the user. In various embodiments, the rule includes an indication to arrange the displays based on an application being used on one or more of the displays.

In one embodiment, the device analysis module 306 analyzes information from the information handling device 102 worn by, used by, and/or held by the user to determine whether the user is sitting or standing. For example, in one embodiment, the device analysis module 306 receives accelerometer, gyroscope or other sensor data and uses the data to determine whether the user is sitting or standing. As another example, the device analysis module 306 receives any suitable data that may be processed to determine a change in position from a user standing and/or sitting.

In some embodiments, the device analysis module 306 analyzes information from the information handling device 102 worn by, used by, and/or held by the user to determine a physical location of the user. For example, the device analysis module 306 may analyze geospatial information (e.g., information obtained from a global positioning system ("GPS")) to determine a physical location of the user. In certain embodiments, the device analysis module 306 may determine a physical location of a user by detecting a user's presence near a Bluetooth™ beacon, using an RFID system, and/or by analyzing the Wi-Fi wireless networks that the information handling device 102 receives packets from. Such information may be used to determine whether the user is at a predefined location, such as work, home, and so forth.

The settings module 308, in certain embodiments, sets the arrangement for the multiple displays based on the determined arrangement. For example, the settings module 308 may change the settings corresponding to the displays to set the arrangement based on what has been determined.

Figure 4:
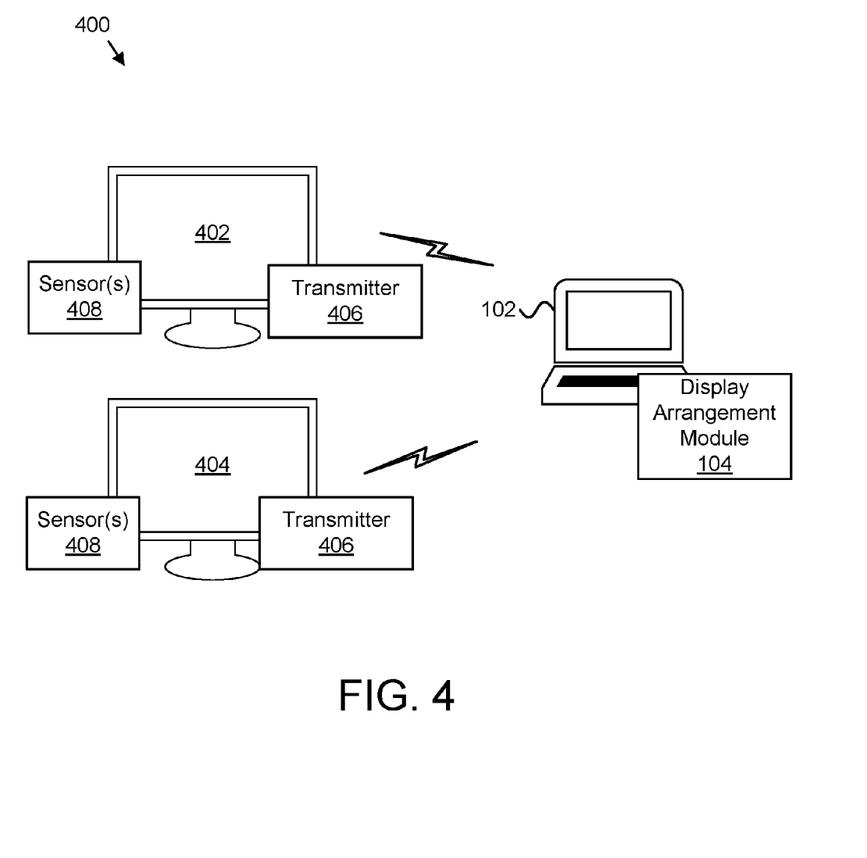
FIG. 4 is a schematic block diagram illustrating one embodiment of a system for dynamic display arrangement in accordance with one embodiment of the present invention.

FIG. 4 is a schematic block diagram illustrating one embodiment of a system 400 for dynamic display arrangement. The system 400 includes a first display 402 and a second display 404 arranged in a vertical arrangement. The first and second displays 402, 404 each include a transmitter 406 that may be used to indicate location information of the first and second displays 402, 404. The first and second displays 402, 404 also include one or more sensors 408 that may also be used to detect motion used to initiate transmission of location information. In certain embodiments, the transmitters 406 may include any suitable transmitter used to transmit a wireless signal. For example, the transmitters 406 may be used to transmit a Wi-Fi transmission, a Bluetooth™ transmission, an RFID transmission, a Zigbee® transmission, a MIMO transmission, an audio transmission, a WiDi transmission, a sensory transmission, and so forth. The one or more sensors 408 may include a motion sensor, an optical sensor, a camera, and so forth. In some embodiments, the first and second displays 402, 404 may be coupled to the information handling device 102 via a wire or cable.

As discussed above, the display arrangement module 104 may receive the location information from the first and second displays 402, 404 to determine the arrangement of the displays. In the illustrated example, the display arrangement module 104 determines that the first display 402 is positioned vertically above the second display 404 based on the received location information.

Figure 5:
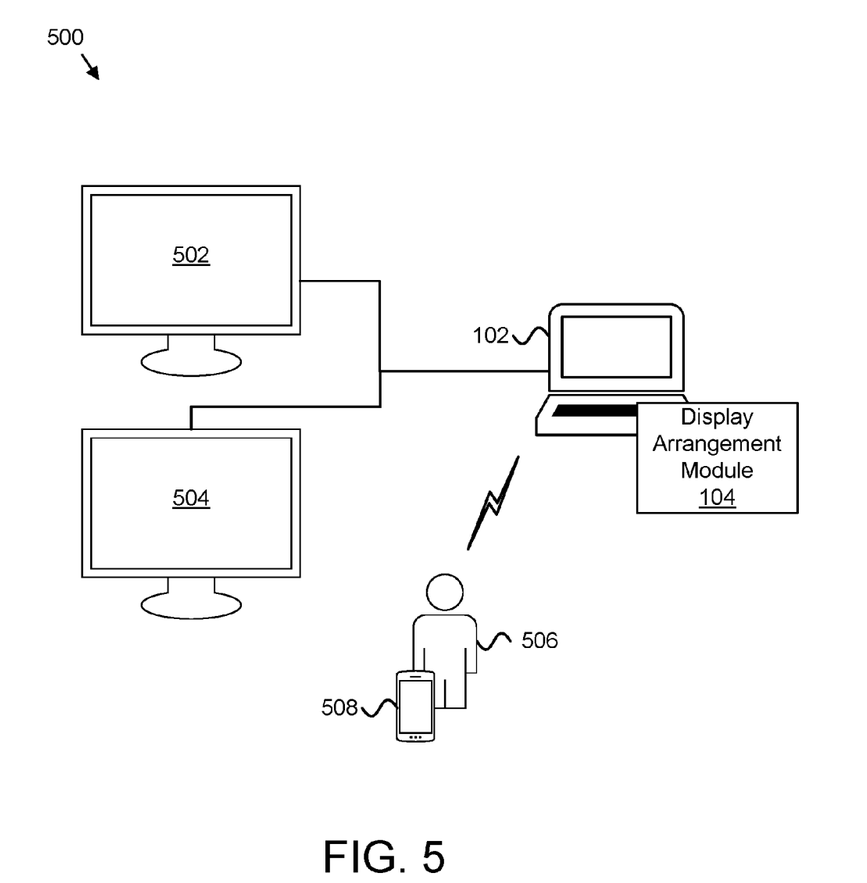
FIG. 5 is a schematic block diagram illustrating another embodiment of a system for dynamic display arrangement in accordance with one embodiment of the present invention.

FIG. 5 is a schematic block diagram illustrating another embodiment of a system 500 for dynamic display arrangement. The system 500 includes a first display 502 and a second display 504 arranged in a vertical arrangement. A user 506 of the first and second displays 502, 504 has an information handling device 508 that is worn by, used by, and/or held by the user 506. As discussed above, the display arrangement module 104 may receive information from the information handling device 508 that is worn by, used by, and/or held by the user 506 and may also receive context information that includes rules used to determine the arrangement of the first and second displays 402, 404. In the illustrated example, the display arrangement module 104 determines that the first display 402 is positioned vertically above the second display 404 based on the information from the information handling device 508 that is worn by, used by, and/or held by the user 506 and the context information. In certain embodiments, the information handling device 508 is similar to the information handling device 102. In some embodiments, the information handling device 508 may be a watch, an activity tracker, a smart phone, or the like.

Figure 6:
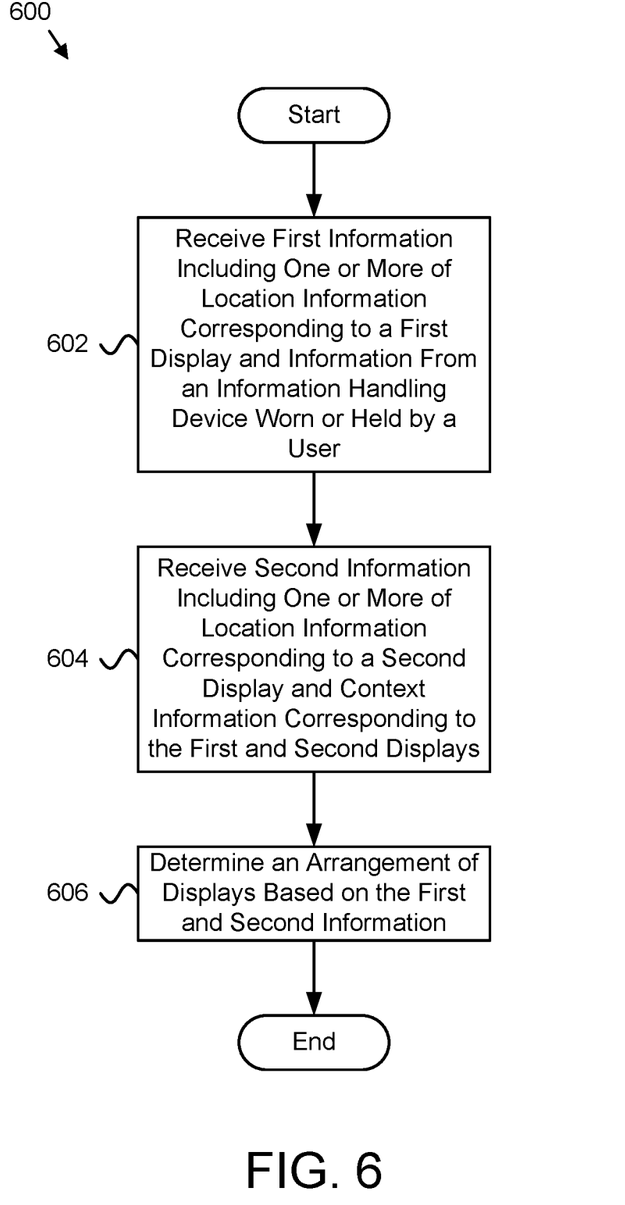
FIG. 6 is a schematic flow chart diagram illustrating one embodiment of a method for dynamic display arrangement in accordance with one embodiment of the present invention.

FIG. 6 is a schematic flow chart diagram illustrating one embodiment of a method 600 for dynamic display arrangement. In certain embodiments, the method 600 may be performed by the display arrangement module 104. In one embodiment, the method 600 begins and receives 602 first information including one or more of location information corresponding to a first display of multiple displays and information from an information handling device worn or held by a user. In some embodiments, the interface module 202 receives 602 the first information. The method 600 may receive 604 second information including one or more of location information corresponding to a second display of the multiple displays and context information corresponding to the first and second displays. In one embodiment, the interface module 202 may receive 604 the second information.

The method 600, in one embodiment, includes wirelessly receiving the first and second information from the first and second displays. In certain embodiments of the method 600, receiving the first and second information includes receiving the first and second information at predetermined intervals. In some embodiments of the method 600, receiving the first and second information includes receiving the first and second information in response to a detected motion. In various embodiments of the method 600, receiving the first and second information includes receiving the first and second information in response to a software application change.

In one embodiment, the information handling device includes one or more of a watch, an activity tracker, and a smart phone. In certain embodiments, the context information includes a rule for the arrangement of the multiple displays based on the information from the information handling device. In some embodiments, the rule includes an indication to arrange the multiple displays in response to one or more of a user sitting and a user standing. In various embodiments, the rule includes an indication to arrange the multiple displays based on a physical location of the user. In one embodiment, the rule includes an indication to arrange the multiple displays based on an application being used on one or more of the first and second displays.

The method 600 may determine 606 an arrangement of the multiple displays based on the first and second information, and the method 600 may end. In certain embodiments, the arrangement determination module 204 may determine 606 the arrangement of the multiple displays based on the first and second information.

Figure 7:
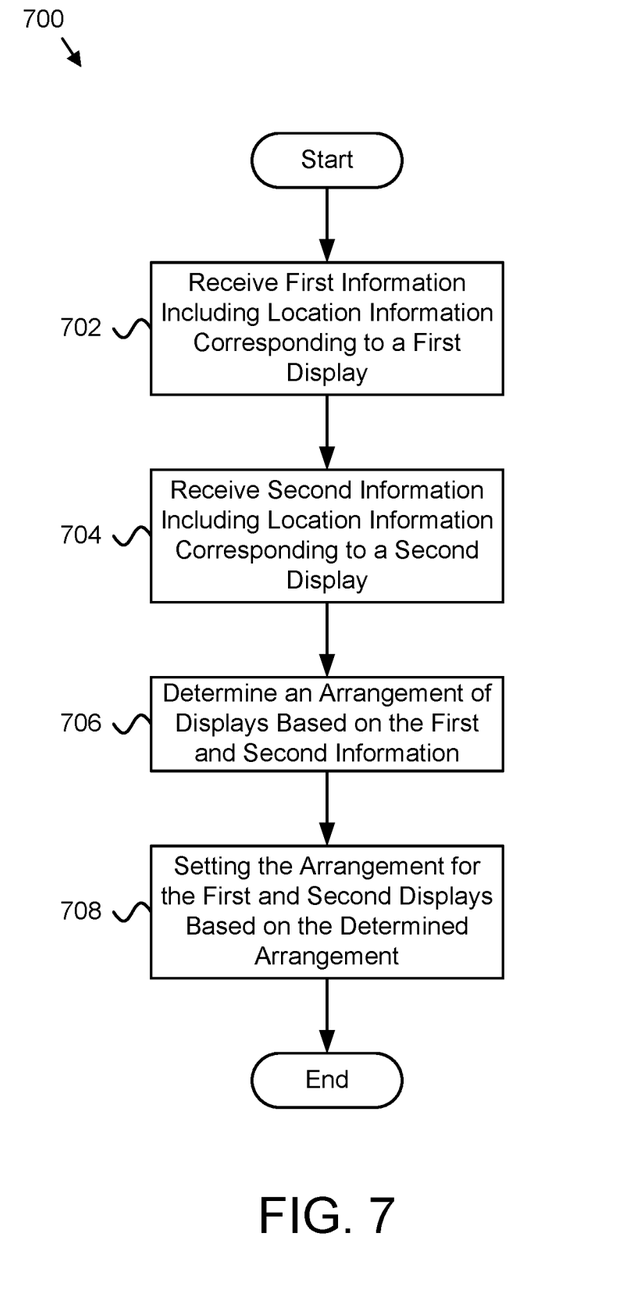
FIG. 7 is a schematic flow chart diagram illustrating another embodiment of a method for dynamic display arrangement in accordance with one embodiment of the present invention.

FIG. 7 is a schematic flow chart diagram illustrating another embodiment of a method 700 for dynamic display arrangement. In certain embodiments, the method 700 may be performed by the display arrangement module 104. In one embodiment, the method 700 begins and receives 702 first information including location information corresponding to a first display of multiple displays. In some embodiments, the interface module 202 receives 702 the first information. The method 700 may receive 704 second information including location information corresponding to a second display of the multiple displays. In one embodiment, the interface module 202 may receive 704 the second information.

The method 700, in one embodiment, includes wirelessly receiving the first and second information from the first and second displays. In certain embodiments of the method 700, receiving the first and second information includes receiving the first and second information at predetermined intervals. In some embodiments of the method 700, receiving the first and second information includes receiving the first and second information in response to a detected motion. In various embodiments of the method 700, receiving the first and second information includes receiving the first and second information in response to a software application change.

The method 700 may determine 706 an arrangement of the multiple displays based on the first and second information. In certain embodiments, the arrangement determination module 204 may determine 706 the arrangement of the multiple displays based on the first and second information. The method 700 may set 708 the arrangement of the first and second displays based on the determined arrangement, and the method 700 may end. In one embodiment, the settings module 308 may set 708 the arrangement of the first and second displays based on the determined arrangement.

Figure 8:
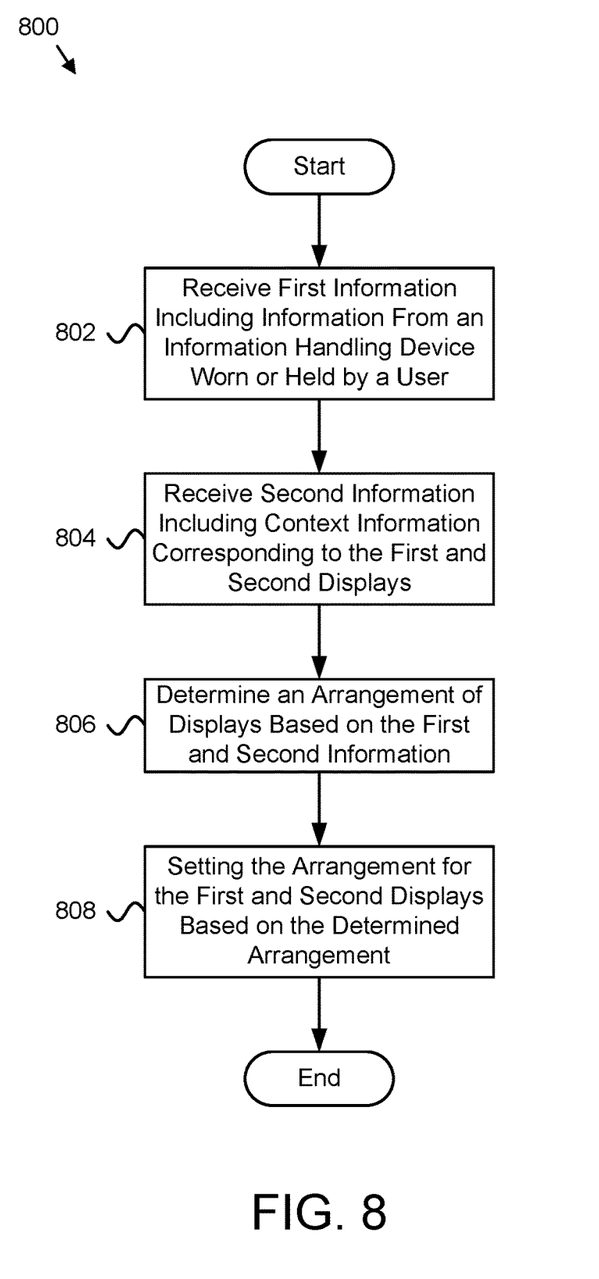
FIG. 8 is a schematic flow chart diagram illustrating a further embodiment of a method for dynamic display arrangement in accordance with one embodiment of the present invention.

FIG. 8 is a schematic flow chart diagram illustrating a further embodiment of a method 800 for dynamic display arrangement. In certain embodiments, the method 800 may be performed by the display arrangement module 104. In one embodiment, the method 800 begins and receives 802 first information including information from an information handling device worn or held by a user. In some embodiments, the interface module 202 receives 802 the first information. The method 800 may receive 804 second information including context information corresponding to the first and second displays. In one embodiment, the interface module 202 may receive 804 the second information.

In certain embodiments of the method 800, receiving the first and second information includes receiving the first and second information at predetermined intervals. In some embodiments of the method 800, receiving the first and second information includes receiving the first and second information in response to a detected motion. In various embodiments of the method 800, receiving the first and second information includes receiving the first and second information in response to a software application change.

In one embodiment, the information handling device includes one or more of a watch, an activity tracker, and a smart phone. In certain embodiments, the context information includes a rule for the arrangement of the multiple displays based on the information from the information handling device. In some embodiments, the rule includes an indication to arrange the multiple displays in response to one or more of a user sitting and a user standing. In various embodiments, the rule includes an indication to arrange the multiple displays based on a physical location of the user. In one embodiment, the rule includes an indication to arrange the multiple displays based on an application being used on one or more of the first and second displays.

The method 800 may determine 806 an arrangement of the multiple displays based on the first and second information. In certain embodiments, the arrangement determination module 204 may determine 806 the arrangement of the multiple displays based on the first and second information. The method 800 may set 808 the arrangement of the first and second displays based on the determined arrangement, and the method 800 may end. In one embodiment, the settings module 308 may set 808 the arrangement of the first and second displays based on the determined arrangement.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
an interface module that:
receives first information comprising information from an information handling device worn or held by a user, wherein the information comprises a position of the user, a location of the user, or some combination thereof;
receives second information comprising context information corresponding to first and second displays of a plurality of displays, wherein the context information comprises a rule for arranging the plurality of displays based on a position of the user, a location of the user, or some combination thereof, the rule for arranging the plurality of displays comprises a rule for a software arrangement of the plurality of displays used to match a physical arrangement of the plurality of displays, the software arrangement comprises a horizontal arrangement, a vertical arrangement, or a scattered arrangement, the physical arrangement comprises the horizontal arrangement, the vertical arrangement, or the scattered arrangement, and the physical arrangement of the plurality of displays corresponds to the position of the user, the location of the user, or some combination thereof;
an arrangement determination module that determines a software arrangement of the plurality of displays based on the first and second information; and
a settings module that changes software settings of the plurality of displays to set the software settings to the horizontal arrangement, the vertical arrangement, or the scattered arrangement based on the determined software arrangement in response to a change in the position of the user, the location of the user, or some combination thereof;
wherein at least a portion of the interface module, the arrangement module, and the settings module comprises one or more of hardware and executable code, the executable code being stored on one or more computer readable storage media.

2. The apparatus of claim 1, further comprising a location determination module that determines a location of the first display using the first information and determines a location of the second display using the second information.

3. The apparatus of claim 1, further comprising a context module that determines context information corresponding to the first and second displays.

4. The apparatus of claim 1, further comprising a device analysis module that analyzes information from the information handling device worn or held by the user to determine whether the user is sitting or standing.

5. The apparatus of claim 1, further comprising a device analysis module that analyzes information from the information handling device worn or held by the user to determine a physical location of the user.

6. A method for arranging a plurality of displays, comprising:
receiving first information comprising information from an information handling device worn or held by a user, wherein the information comprises a position of the user, a location of the user, or some combination thereof;
receiving second information comprising context information corresponding to first and second displays of a plurality of displays, wherein the context information comprises a rule for arranging the plurality of displays based on a position of the user, a location of the user, or some combination thereof, the rule for arranging the plurality of displays comprises a rule for a software arrangement of the plurality of displays used to match a physical arrangement of the plurality of displays, the software arrangement comprises a horizontal arrangement, a vertical arrangement, or a scattered arrangement, the physical arrangement comprises the horizontal arrangement, the vertical arrangement, or the scattered arrangement, and the physical arrangement of the plurality of displays corresponds to the position of the user, the location of the user, or some combination thereof;

determining a software arrangement of the plurality of displays based on the first and second information; and changing software settings of the plurality of displays to set the software settings to the horizontal arrangement, the vertical arrangement, or the scattered arrangement based on the determined software arrangement in response to a change in the position of the user, the location of the user, or some combination thereof.

7. The method of claim 6, wherein the first information comprises the location information corresponding to the first display and the second information comprises the location information corresponding to the second display.

8. The method of claim 7, further comprising wirelessly receiving the first and second information from the first and second displays.

9. The method of claim 6, wherein receiving the first and second information comprises receiving the first and second information at predetermined intervals.

10. The method of claim 6, wherein receiving the first and second information comprises receiving the first and second information in response to a detected motion.

11. The method of claim 6, wherein receiving the first and second information comprises receiving the first and second information in response to a software application change.

12. The method of claim 6, wherein the first information comprises information from the information handling device worn or held by the user and the second information comprises context information corresponding to the first and second displays.

13. The method of claim 12, wherein the information handling device comprises one or more of a watch, an activity tracker, and a smart phone.

14. The method of claim 6, wherein the rule comprises an indication to arrange the plurality of displays in response to one or more of a user sitting and a user standing.

15. The method of claim 6, wherein the rule comprises an indication to arrange the plurality of displays based on a physical location of the user.

16. The method of claim 6, wherein the rule comprises an indication to arrange the plurality of displays based on an application being used on one or more of the first and second displays.

17. A non-transitory computer readable storage medium having program instructions embodied therewith, the program instructions executable by a processor, the program instructions comprising code to:

receive first information comprising information from an information handling device worn or held by a user, wherein the information comprises a position of the user, a location of the user, or some combination thereof;

receive second information comprising context information corresponding to first and second displays of a plurality of displays, wherein the context information comprises a rule for arranging the plurality of displays based on a position of the user, a location of the user, or some combination thereof, the rule for arranging the plurality of displays comprises a rule for a software arrangement of the plurality of displays used to match a physical arrangement of the plurality of displays, the software arrangement comprises a horizontal arrangement, a vertical arrangement, or a scattered arrangement, the physical arrangement comprises the horizontal arrangement, the vertical arrangement, or the scattered arrangement, and the physical arrangement of the plurality of displays corresponds to the position of the user, the location of the user, or some combination thereof;

determine a software arrangement of the plurality of displays based on the first and second information; and change software settings of the plurality of displays to set the software settings to the horizontal arrangement, the vertical arrangement, or the scattered arrangement based on the determined software arrangement in response to a change in the position of the user, the location of the user, or some combination thereof.

* * * * *